US012785574B2

(12) United States Patent
Takagi et al.

(10) Patent No.: US 12,785,574 B2
(45) Date of Patent: Nov. 3, 2026

(54) MULTI-PHASE LLC RESONANT CONVERTER CIRCUIT

(71) Applicant: GS Yuasa International Ltd., Kyoto (JP)

(72) Inventors: Kazuto Takagi, Kyoto (JP); Yuki Aoyagi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 109 days.

(21) Appl. No.: 18/865,953

(22) PCT Filed: May 15, 2023

(86) PCT No.: PCT/JP2023/018137
§ 371 (c)(1),
(2) Date: Nov. 14, 2024

(87) PCT Pub. No.: WO2023/224008
PCT Pub. Date: Nov. 23, 2023

(65) Prior Publication Data
US 2025/0317066 A1 Oct. 9, 2025

(30) Foreign Application Priority Data
May 16, 2022 (JP) ................................ 2022-080186

(51) Int. Cl.
*H02M 3/335* (2006.01)
*H02M 3/00* (2006.01)
*H02M 3/28* (2006.01)

(52) U.S. Cl.
CPC ....... *H02M 3/33569* (2013.01); *H02M 3/003* (2021.05); *H02M 3/01* (2021.05); *H02M 3/28* (2013.01); *H02M 3/33571* (2021.05)

(58) Field of Classification Search
CPC .......... H02M 3/003; H02M 3/01; H02M 3/28; H02M 3/33569; H02M 3/33571
See application file for complete search history.

(56) References Cited

U.S. PATENT DOCUMENTS

2010/0220505 A1* 9/2010 Tsuruya .................. H02M 3/01 363/25
2010/0328968 A1 12/2010 Adragna
(Continued)

FOREIGN PATENT DOCUMENTS

| | | | |
|---|---|---|---|
| JP | 6696617 | B1 | 5/2020 |
| JP | 2021-118604 | A | 8/2021 |
| JP | 2021-153382 | A | 9/2021 |

OTHER PUBLICATIONS

International Search Report and Written Opinion for Patent Cooperation Treaty Application No. PCT/JP2023/018137, dated Jul. 4, 2023, 8 pages.

*Primary Examiner* — Gary A Nash
(74) *Attorney, Agent, or Firm* — Buchalter LLP

(57) ABSTRACT

A multi-phase LLC resonant converter circuit (10) includes: first to third LLC resonant converters each including a series circuit (S1 to S3) of a first switch and a second switch that are connected in parallel to a DC power supply, a high-frequency transformer (T1 to T3) including a primary-side winding and a secondary-side winding, a resonant circuit including a resonant reactor (Lr1 to Lr3) connected between a connection point of the first switch and the second switch and one end of the primary-side winding, a resonant capacitor (Cr1 to Cr3) in which one end is connected to the other end of the primary-side winding, and a divided resonant capacitor (Cn1 to Cn3) in which one end is connected to a connection point of the primary-side winding and the resonant capacitor; a first neutral line (N1) that connects the other end of the resonant capacitor; a neutral line reactor
(Continued)

(Ln) connected between the first neutral line and a power supply line of the DC power supply; and a second neutral line (N2) that connects the other end of the divided resonant capacitor.

10 Claims, 12 Drawing Sheets

(56) References Cited

U.S. PATENT DOCUMENTS

| | | | | |
|---|---|---|---|---|
| 2019/0044447 | A1* | 2/2019 | Wang | H02M 3/33576 |
| 2019/0157978 | A1* | 5/2019 | Ni | H02M 1/14 |
| 2020/0044571 | A1 | 2/2020 | Bouchez | |

* cited by examiner (a)

(b)

MULTI-PHASE LLC RESONANT CONVERTER CIRCUIT

CROSS REFERENCE TO RELATED APPLICATIONS

This application is a National Stage Application, filed under 35 U.S.C. § 371, of International Application No. PCT/JP2023/018137, filed May 15, 2023, which international application claims priority to and the benefit of Japanese Application No. 2022-080186, filed May 16, 2022; the contents of both of which as are hereby incorporated by reference in their entireties.

BACKGROUND

Technical Field

The present invention relates to a multi-phase LLC resonant converter circuit that converts a first DC voltage of DC power supply into a second DC voltage to output the second DC voltage.

Description of Related Art

Conventionally, a multi-phase (N-phase) LLC resonant converter circuit is known as a converter circuit that converts a first DC voltage of the DC power supply into a second DC voltage to output the second DC voltage (see Patent Document JP-B2-6696617). In this circuit, a plurality of (N) LLC resonant converters are connected in parallel to the DC power supply, and switches of the respective LLC resonant converters are turned on and off such that the resonant currents of the resonant circuits connected to the primary-side windings of the high-frequency transformers of the respective LLC resonant converters have a phase difference of 360°/N.

When the voltage value of the DC power supply is rating (for example, 380 V), the LLC resonant converter is preferably designed such that a switching frequency turning on and off the switch is around a resonance frequency of the resonant circuit. On the other hand, in a case where the voltage value of the DC input voltage decreases (for example, decrease to 300 V), a circuit loss increases to decrease efficiency when a boosting operation is performed by decreasing the switching frequency of the switch. Considering the same output power, when the voltage value of the DC input voltage decreases, the value of the DC input current increases in inverse proportion to the decrease, so that it is natural that the efficiency decreases to some extent. However, actually, a peak value of the resonant current flowing through the resonant circuit increases more than the increase in the value of a DC input current. The majority of the unwanted current that increases the resonant current is a third harmonic current having a frequency three times the switching frequency.

FIG. 11 illustrates a multi-phase LLC resonant converter circuit 13 of a conventional example. This circuit includes both a first neutral line N1 connected to a power line of a DC power supply Vin and a floating second neutral line N2 (see Patent Documents JP-B2-6696617 and JP-A-2021-153382). In the multi-phase operation mode, the multi-phase LLC resonant converter circuit 13 of the conventional example can naturally balance the resonant currents ir1, ir2, ir3 flowing through the resonant circuits 41, 42, 43, and switch from the multi-phase operation mode to the single-phase operation mode.

In the multi-phase LLC resonant converter circuit 13 of the conventional example, when a DC input voltage Vin of the DC power supply 30 is a rating (for example, 380 V), the resonant current ir (ir1, ir2, ir3) flowing through each phase of the series resonant circuits 41,42, 43 is substantially sinusoidal as illustrated in FIG. 12 (*a*), and the value of the neutral line current in flowing through the neutral line N1 is substantially zero as illustrated in FIG. 12 (*b*). However, when the boosting operation is performed by lowering the switching frequency of the switch in the case where the DC input voltage Vin of the DC power supply 30 is lowered (for example, decrease to 300 V) from the rating (for example, 380 V), the effective value of the resonant current ir increases due to the generation of the third harmonic component in the resonant current ir (ir1, ir2, ir3) as illustrated in FIG. 13(*a*). As illustrated in FIG. 13(*b*), the third harmonic current flows as the neutral line current in the first neutral line N1.

Furthermore, in the multi-phase LLC resonant converter circuit 13 of the conventional example, the resonance frequency changes when the multi-phase operation mode is switched to the single-phase operation mode.

BRIEF SUMMARY

An aspect of the present invention provides a multi-phase LLC resonant converter circuit capable of preventing an increase in a resonant current and generation of the third harmonic current flowing through the neutral line during the boosting operation when a DC input voltage drops below the rating in the multi-phase operation mode, and capable of not changing the resonance frequency when the multi-phase operation mode is switched to the single-phase operation mode.

A multi-phase LLC resonant converter circuit according to an aspect of the present invention is a multi-phase LLC resonant converter circuit that converts a first DC voltage of a DC power supply into a second DC voltage to output the second. DC voltage, the multi-phase LLC resonant converter circuit including: first to Nth (N is an integer greater than or equal to 2) LLC resonant converters each including a series circuit in which a first switch and a second switch are connected in series, the series circuit being connected in parallel to the DC power supply, a high-frequency transformer including a primary-side winding and a secondary-side winding, a resonant circuit including a resonant reactor connected between a connection point between the first switch and the second switch and one end of the primary-side winding, a resonant capacitor in which one end is connected to the other end of the primary-side winding, and a divided resonant capacitor pn which one end is connected to a connection point between the primary-side winding and the resonant capacitor, and a rectifier circuit that rectifies output of the secondary-side winding; a first neutral line that connects the other ends of the resonant capacitors of the first to Nth LLC resonant converters to each other; a neutral line reactor connected between the first neutral line and a power supply line of one of a positive electrode and a negative electrode of the DC power supply; a second neutral line that connects the other ends of the divided resonant capacitors of the first to Nth LLC resonant converters to each other, and an output capacitor connected in parallel to an output side of the rectifier circuit of the first to Nth LLC resonant converters to output a second DC voltage to both ends.

DETAILED DESCRIPTION OF VARIOUS EMBODIMENTS

Hereinafter, a multi-phase LLC resonant converter circuit according to an embodiment of the present invention will be described in detail with reference to the drawings. The present invention is not limited to the embodiments described below.

First Embodiment

Figure 1:
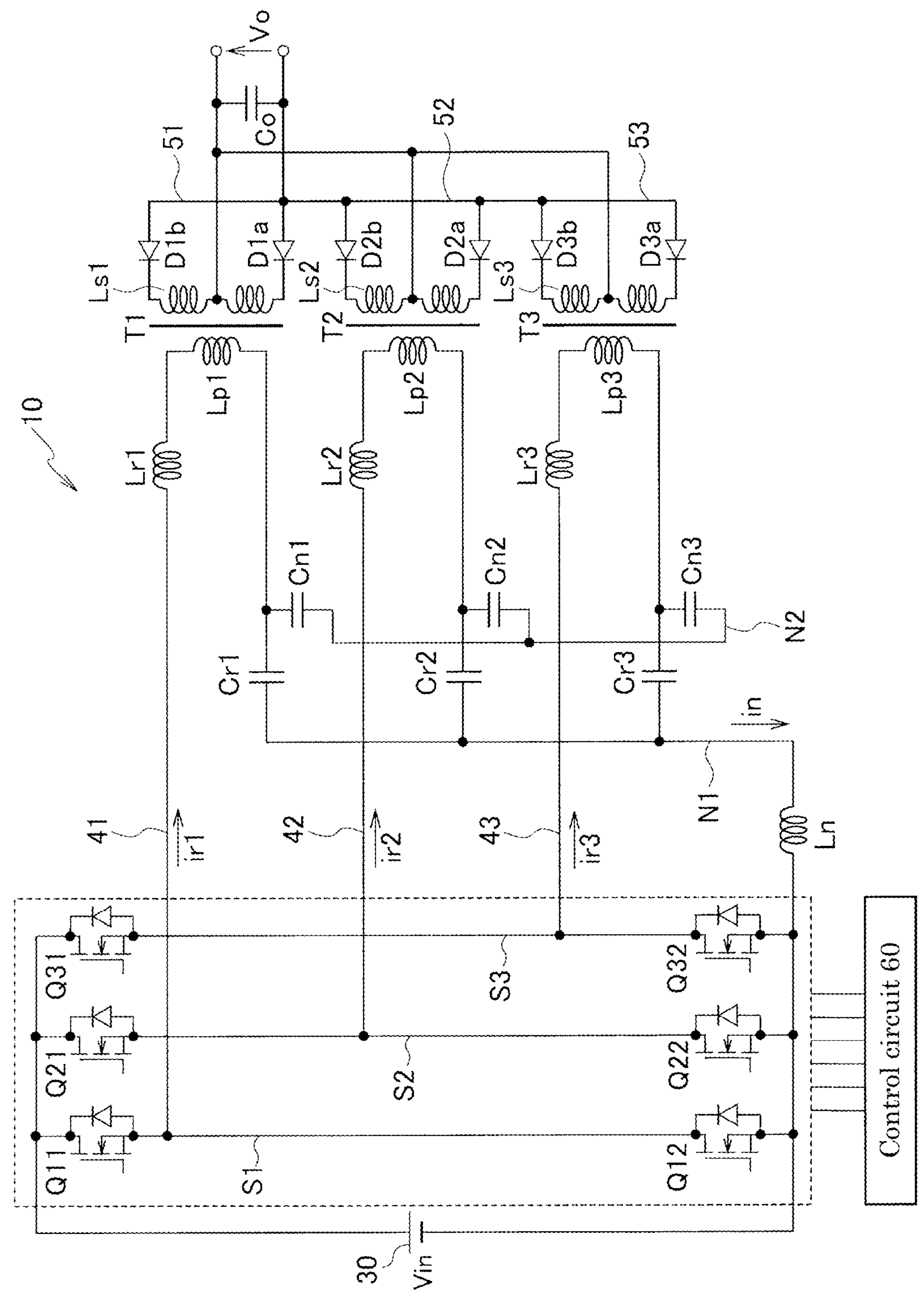
FIG. 1 is a circuit diagram illustrating a configuration of a multi-phase LLC resonant converter circuit according to a first embodiment.

FIG. 1 is a circuit diagram illustrating a configuration of a multi-phase LLC resonant converter circuit 10 according to a first embodiment. At this point, a configuration in a case where the number of phases N of the multi-phase LLC resonant converter circuit 10 is 3 (three-phase LLC resonant converter circuit) will be described.

The multi-phase LLC resonant converter circuit 10 includes a first series circuit S1 in which a first switch Q11 and a second switch Q12 are connected in series, a second series circuit S2 in which the first switch Q21 and the second switch Q22 are connected in series, and a third series circuit S3 in which the first switch Q31 and the second switch Q32 are connected in series, which are connected in parallel to a DC power supply 30 having a DC voltage value Vin.

In the first embodiment, an N-channel MOSFET is used for each of the switches Q11, Q12, Q21, Q22, Q31, Q32. However, other switching elements may be used.

One end of a first resonant reactor Lr1 is connected to a connection point between the first switch Q11 and the second switch Q12 of the first series circuit S1. One end of a second resonant reactor Lr2 is connected to a connection point between the first switch Q21 and the second switch Q22 of the second series circuit S2. One end of a third resonant reactor Lr3 is connected to a connection point between the first switch Q31 and the second switch Q32 of the third series circuit S3.

One end of a primary-side winding Lp1 of a first high-frequency transformer T1 is connected to the other end of the first resonant reactor Lr1, one end of a first resonant capacitor Cr1 is connected to the other end of the primary-side winding Lp1 of the first high-frequency transformer T1, and one end of a first divided resonant capacitor Cn1 is connected to a connection point between the primary-side winding Lp1 of the first high-frequency transformer T1 and the first resonant capacitor Cr1, thereby configuring a first resonant circuit 41. The first high-frequency transformer T1 includes a core, the primary-side winding Lp1, and a secondary-side winding Ls1. The primary-side winding Lp1 and the secondary-side winding Ls1 are insulated from each other.

One end of a primary-side winding Lp2 of a second high-frequency transformer T2 is connected to the other end of the second resonant reactor Lr2, one end of a second resonant capacitor Cr2 is connected to the other end of the primary-side winding Lp2 of the second high-frequency transformer T2, and one end of a second divided resonant capacitor Cn2 is connected to a connection point between the primary-side winding Lp2 of the second high-frequency transformer T2 and the second resonant capacitor Cr2, thereby configuring a second resonant circuit 42. The second high-frequency transformer T2 includes a core, the primary-side winding Lp2, and a secondary-side winding Ls2. The primary-side winding Lp2 and the secondary-side winding Ls2 are insulated from each other.

One end of a primary-side winding Lp3 of a third high-frequency transformer T3 is connected to the other end of the third resonant reactor Lr3, one end of a third resonant capacitor Cr3 is connected to the other end of the primary-side winding Lp3 of the third high-frequency transformer T3, and one end of a third divided resonant capacitor Cn3 is connected to a connection point between the primary-side winding Lp3 of the third high-frequency transformer T3 and the third resonant capacitor Cr3, thereby configuring a third resonant circuit 43. The third high-frequency transformer T3 includes a core, the primary-side winding Lp3, and a secondary-side winding Ls3. The primary-side winding Lp3 and the secondary-side winding Ls3 are insulated from each other.

The other end of the first resonant capacitor Cr1, the other end of the second resonant capacitor Cr2, and the other end of the third resonant capacitor Cr3 are connected to each other by a first neutral line N1.

The first neutral line N1 is connected to a power supply line on a negative electrode side of the DC power supply 30 through a neutral line reactor Ln. The first neutral line N1 may be connected to the power supply line on a positive electrode side of the DC power supply 30 through the neutral line reactor Ln.

The other end of the first divided resonant capacitor Cn1, the other end of the second divided resonant capacitor Cn2, and the other end of the third divided resonant capacitor Cn3 are connected to each other by a floating second neutral line N2.

The resonant reactors Lr1, Lr2, Lr3 are set to an equal inductance value $L_r$. When the resonant reactors Lr1, Lr2, Lr3 do not use magnetic coupling as in a second embodiment described later, a leakage inductance of the high-frequency transformers T1, T2, T3 can also be used. The resonant capacitors Cr1, Cr2, Cr3 are set to equal capacitance $\alpha C_r$. The divided resonant capacitors Cn1, Cn2, Cn3 are set to equal capacitance $(1-\alpha)C_r$. At this point, a is a division ratio of the capacitances of the resonant capacitors Cr1, Cr2, Cr3 and the divided resonant capacitors Cn1, Cn2, Cn3, and is a parameter having a value of $0<\alpha<1$. The inductance value $L_r$ and the capacitance $C_r$ are determined by a value of a desired resonance frequency. The inductance value $L_n$ of the neutral line reactor Ln will be described later.

The high-frequency transformers T1, T2, T3 may use a high-frequency transformer of the same standard, the primary-side windings Lp1, Lp2, Lp3 have the same number of turns Np and are set to the same inductance value $L_p$, and the secondary-side windings Ls1, Ls2, Ls3 are set to the inductance value $L_s$ equal to the same number of turns Ns. A ratio between the number of turns Np of the primary-side winding Lp and the number of turns Ns of the secondary-side winding Ls may be determined by a ratio between the DC input voltage Vin and a DC output voltage Vo.

A cathode of a first rectifier diode D1*a* is connected to the negative electrode side of the secondary-side winding Ls1 of the first high-frequency transformer T1, and a cathode of a second rectifier diode D1*b* is connected to the positive electrode side of the secondary-side winding Ls1 of the first high-frequency transformer T1. The first rectifier diode D1*a* and the second rectifier diode D1*b* configure a first rectifier circuit 51. A neutral point of the secondary-side winding Ls1 of the first high-frequency transformer T1 is connected to one end of an output capacitor Co, and anodes of the first rectifier diode D1*a* and the second rectifier diode D1*b* are connected to the other end of the output capacitor Co, so that an AC voltage output to both ends of the secondary-side winding Ls1 is full-wave rectified and smoothed.

The cathode of a third rectifier diode D2*a* is connected to the negative electrode side of the secondary-side winding Ls2 of the second high-frequency transformer T2, and the cathode of a fourth rectifier diode D2*b* is connected to the positive electrode side of the secondary-side winding Ls2 of the second high-frequency transformer T2. The third rectifier diode D2*a* and the fourth rectifier diode D2*b* configure a second rectifier circuit 52. The neutral point of the secondary-side winding Ls2 of the second high-frequency transformer T2 is connected to one end of the output capacitor Co, and the anodes of the third rectifier diode D2*a* and the fourth rectifier diode D2*b* are connected to the other end of the output capacitor Co, so that the AC voltage output to both ends of the secondary-side winding Ls2 is full-wave rectified and smoothed.

The cathode of a fifth rectifier diode D3*a* is connected to the negative electrode side of the secondary-side winding Ls3 of the third high-frequency transformer T3, and the cathode of a sixth rectifier diode D3*b* is connected to the positive electrode side of the secondary-side winding Ls3 of the third high-frequency transformer T3. The fifth rectifier diode D3*a* and the sixth rectifier diode D3*b* configure a third rectifier circuit 53. The neutral point of the secondary-side winding Ls3 of the third high-frequency transformer T3 is connected to one end of the output capacitor Co, and the anodes of the fifth rectifier diode D3*a* and the sixth rectifier diode D3*b* are connected to the other end of the output capacitor Co, so that the AC voltage output to both ends of the secondary-side winding Ls3 is full-wave rectified and smoothed.

Although a form in which the rectifier diodes are used as the rectifier circuits 51, 52, 53 has been exemplified, it is sufficient that the output voltages of the secondary-side windings Ls1, Ls2, Ls3 can be rectified, and the configurations of the rectifier circuits are arbitrary.

The first series circuit S1, the first resonant circuit 41, the first high-frequency transformer T1, and the first rectifier circuit 51 configure a first LLC resonant converter. Similarly, the second series circuit S2, the second resonant circuit 42, the second high-frequency transformer T2, and the second rectifier circuit 52 configure a second LLC resonant converter, and the third series circuit S3, the third resonant circuit 43, the third high-frequency transformer T3, and the third rectifier circuit 53 configure a third LLC resonant converter.

Outputs of the first to third LLC resonant converters are connected in parallel to both ends of the output capacitor Co, and the DC output voltage Vo is output.

The multi-phase LLC resonant converter circuit 10 is connected to the gates of the switches Q11, Q12, Q21, Q22, Q31, Q32, and includes a control circuit 60 that controls on and off of the switches Q11, Q12, Q21, Q22, Q31, Q32.

The control circuit 60 alternately turns on and off the first switch Q11 and the second switch Q12 of the first series circuit S1 to generate a first resonant current ir1 flowing through the first resonant circuit 41. The control circuit 60 alternately turns on and off the first switch Q21 and the second switch Q22 of the second series circuit S2 to generate a second resonant current ir2 flowing through the second resonant circuit 42. The control circuit 60 alternately turns on and off the first switch Q31 and the second switch Q32 of the third series circuit S3 to generate a third resonant current ir3 flowing through the third resonant circuit 43.

The control circuit 60 controls on and off gate signals of the switches Q11, Q12, Q21, Q22, Q31, Q32 at a predetermined frequency f to generate the resonant currents ir1, ir2, ir3 having the predetermined frequency f.

The control circuit 60 has a multi-phase operation mode in which all of the first, second, and third LLC resonant converters of the multi-phase LLC resonant converter circuit 10 are operated and a single-phase operation mode in which the LLC resonant converter of any one of the first, second, and third LLC resonant converters of the multi-phase LLC resonant converter circuit 10 is operated and the operations of other LLC resonant converters are stopped.

In the multi-phase operation mode, the control circuit 60 controls on and off of all the switches Q11, Q12, Q21, Q22, Q31, Q32 of the series circuits S1, S2, S3 such that the resonant currents ir1, ir2, ir3 flowing through the resonant circuits 41, 42, 43 have a phase difference of 360°/3=120°.

A resonance frequency fi in the multi-phase operation mode is expressed as a resonance frequency by the resonant circuits 41,42, 43 as in Formula 1.

[Mathematical formula 1]

$$f_{r1} = \frac{1}{2\pi\sqrt{L_r C_r}} \quad \text{(Formula 1)}$$

As illustrated in Formula 1, the resonance frequency $f_{r1}$ in the multi-phase operation mode does not depend on the division ratio α and the neutral line reactor Ln. In the multi-phase operation mode, the predetermined frequency f as the switching frequency that turns on and off the switch may be set according to the resonance frequency $f_{r1}$ of Formula 1.

Accordingly, the resonant currents ir1, ir2, ir3 flowing through the series resonant circuits 41, 42, 43 are generated.

Figure 12:
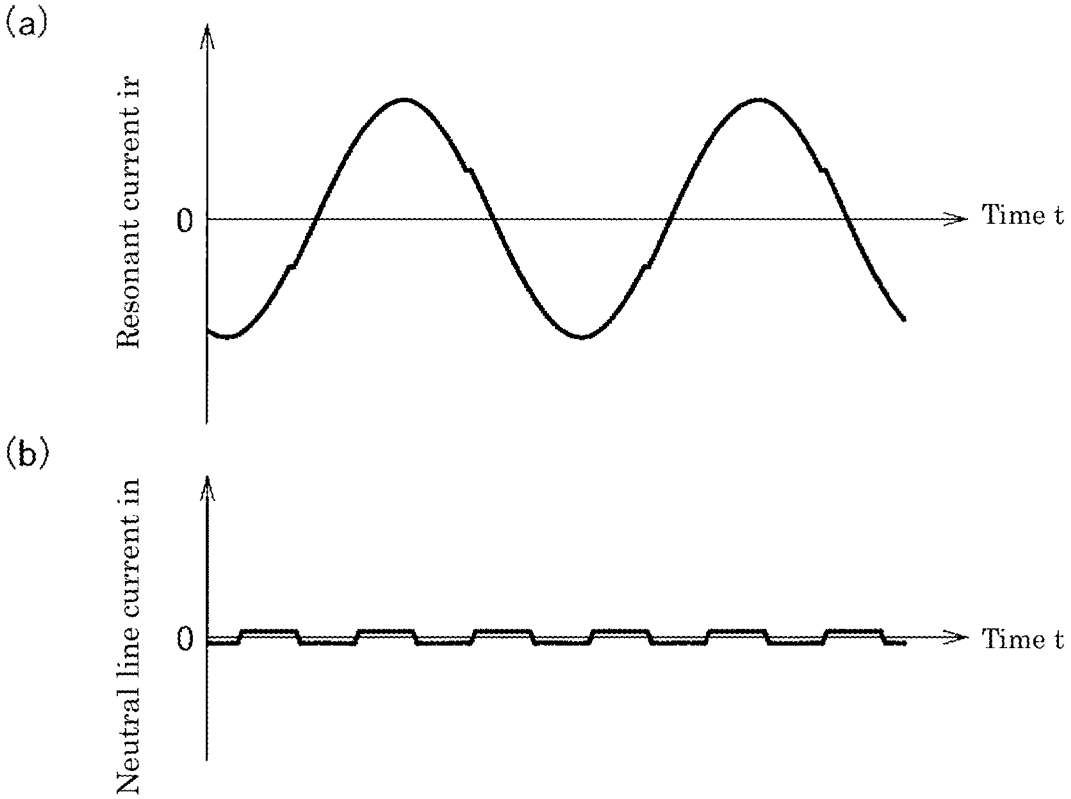
FIG. 12(*a*) is a time chart illustrating a waveform of a resonant current when voltage of a DC power supply is rating (380 V) in the multi-phase LLC resonant converter circuit of the conventional example, and FIG. 12(*b*) is a time chart illustrating a waveform of a neutral line current when the voltage of the DC power supply is rating (380 V).

When the DC input voltage Vin of the DC power supply 30 is the rating (for example, 380 V) in the multi-phase operation mode, the components of the resonant currents ir1, ir2, ir3 having the phase difference of 120° cancel each other, so that the current ir1+ir2+ir3 is usually almost zero. At this time, the resonant current ir flowing through one resonant circuit is similar to that in FIG. 12(*a*) illustrated in the conventional example, and the first neutral line current in flowing through the neutral line N1 is similar to that in FIG. 12(*b*) illustrated in the conventional example.

Figure 2:
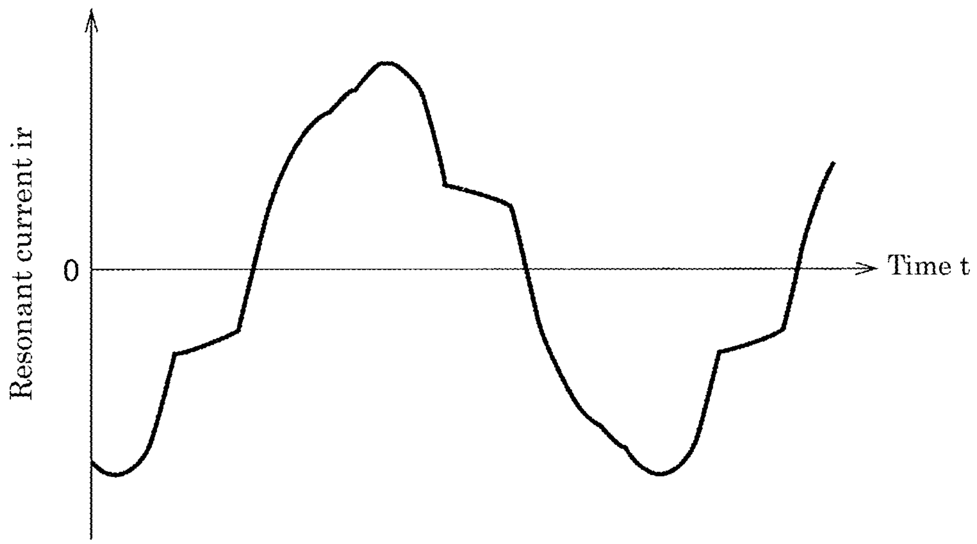
FIG. 2(*a*) is a time chart illustrating a waveform of a resonant current when voltage (300 V) of a DC power supply is boosted in the multi-phase LLC resonant converter circuit according to the first embodiment, and FIG. 2(*b*) is a time chart illustrating a waveform of a neutral line current when the voltage (300 V) of the DC power supply is boosted.
Figure 2:
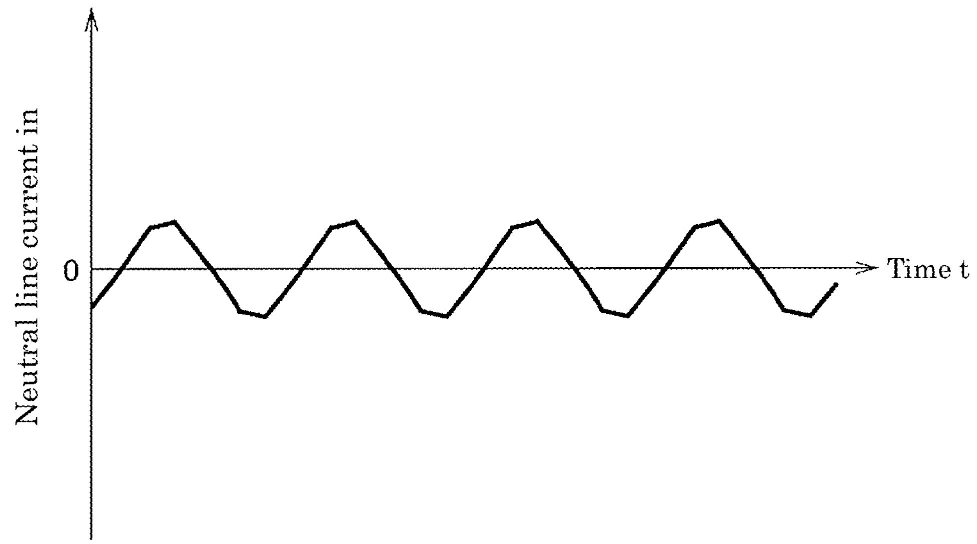
Figure 13:
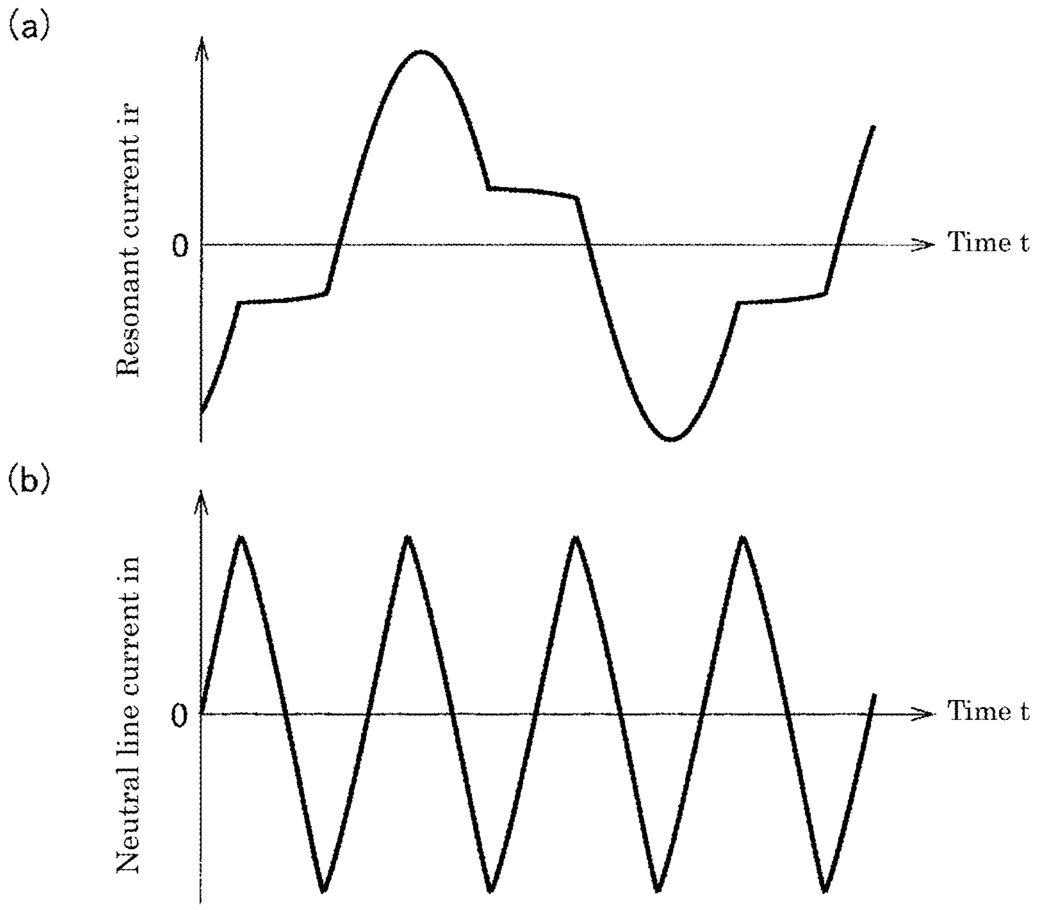
FIG. 13(*a*) is a time chart illustrating a waveform of a resonant current when a voltage (300 V) of a DC power supply is boosted in the multi-phase LLC resonant converter circuit of the conventional example, and FIG. 13(*b*) is a time chart illustrating a waveform of a neutral line current when the voltage (300 V) of the DC power supply is boosted.

In the case where the DC input voltage Vin of the DC power supply 30 is less than the rating (for example, 300 V) in the multi-phase operation mode, when a switching frequency f is made smaller than fr1 to perform a boosting operation, for example, in the case of the conventional example, the neutral line current in having as third-order harmonic component as illustrated in FIG. 13(*b*) is generated in the first neutral line N1. On the other hand, as in the first embodiment, the generation of the neutral line current in having the third-order harmonic component can be prevented by connecting the neutral line reactor Ln between the first neutral line N1 and the power supply line on the negative electrode side (or positive electrode side) of the DC power supply 50. This state is illustrated in FIG. 2. FIG. 2(*a*) illustrates the resonant current ir flowing through one resonant circuit during the boosting operation, and FIG. 2(*b*) illustrates the neutral line current in flowing through the first neutral line N1 during the boosting operation.

As described above, the magnitude of the neutral line current in flowing through the first neutral line N1 during the boosting operation in the first embodiment illustrated in FIG. 2(*b*) can be reduced as compared with the neutral line current in flowing through the first neutral line N1 during the boosting operation in the conventional example illustrated in FIG. 13(*b*). In addition, the resonant current ir flowing through one resonant circuit during the boosting operation in the first embodiment illustrated in FIG. 2(*a*) can reduce the magnitude of the harmonic component as compared with the resonant current ir flowing through one resonant circuit during the boosting operation in the conventional example illustrated in FIG. 13(*a*).

Figure 3:
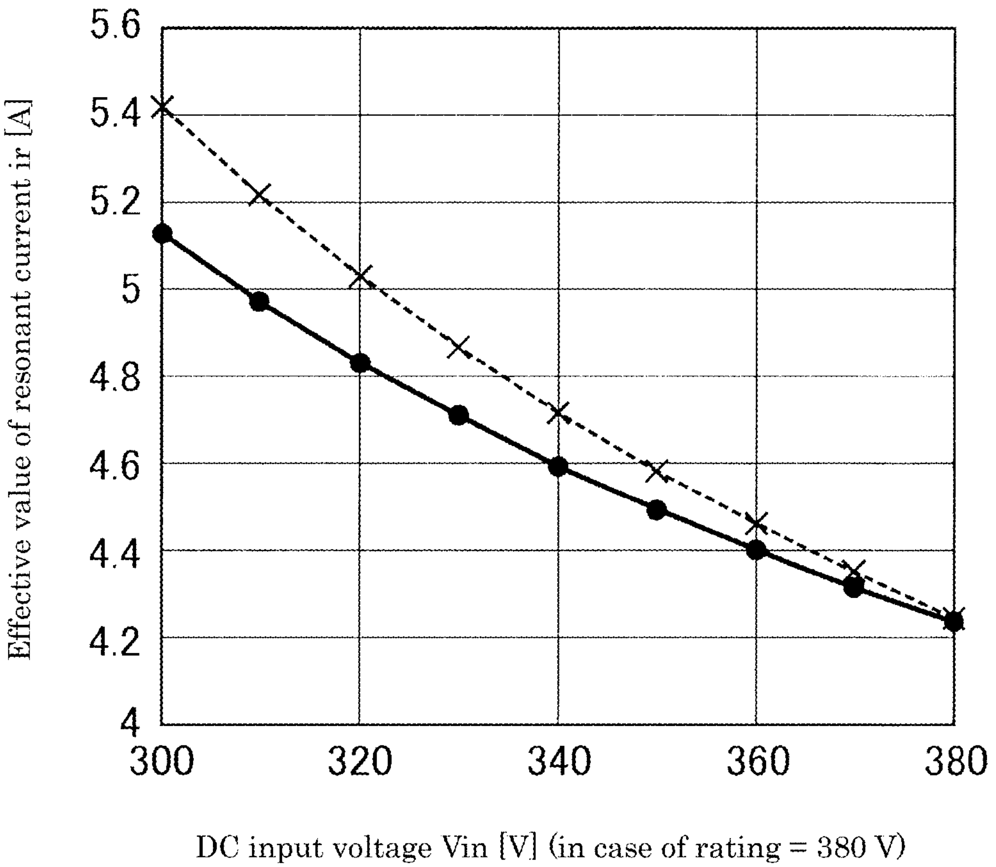
FIG. 3 is a view plotting an effective value of a resonant current with respect to value of a DC input voltage (rating: 380 V) during a boosting operation of the DC input voltage in the multi-phase LLC resonant converter circuits of the first embodiment (solid line) and a conventional example (broken line).
Figure 11:
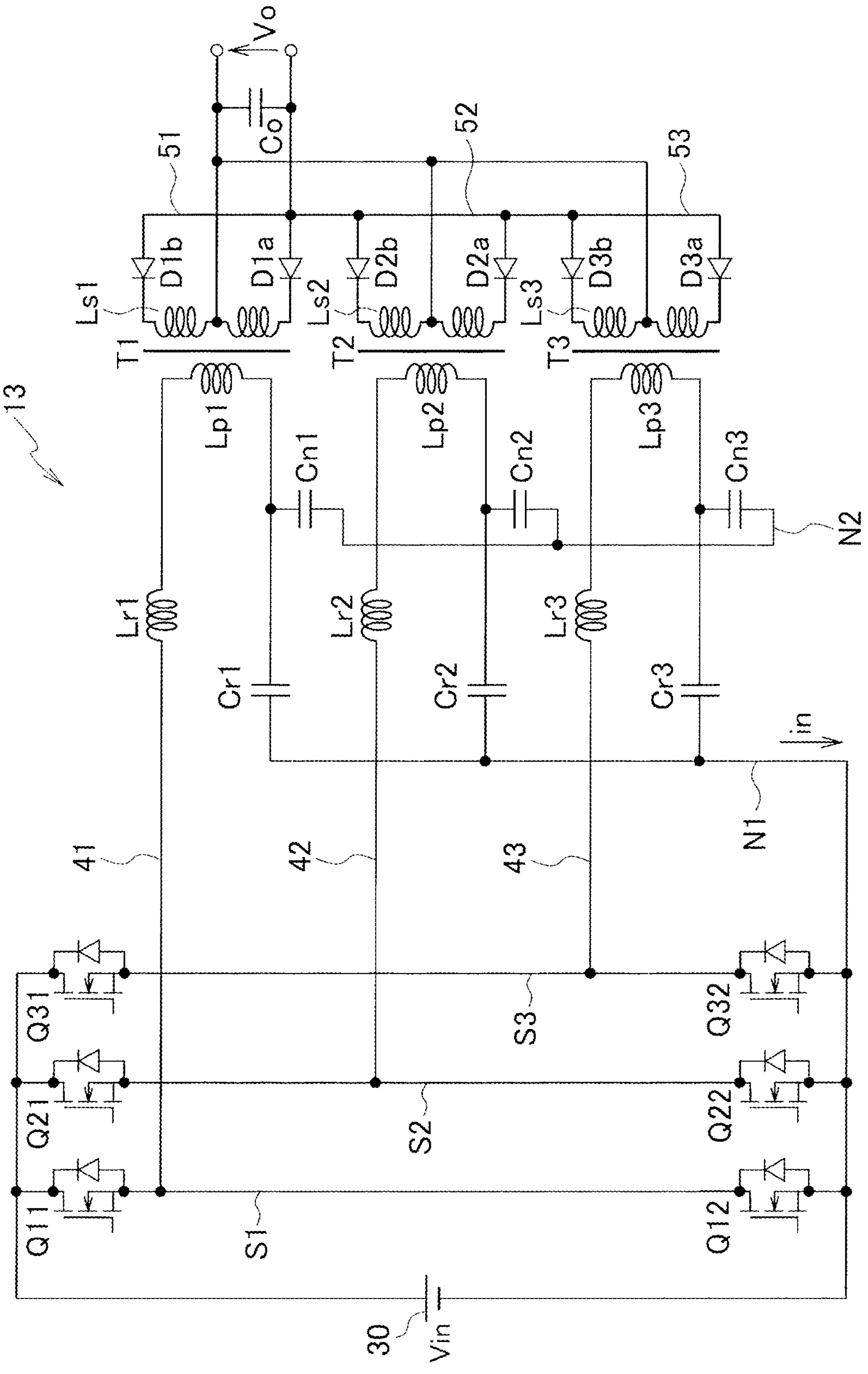
FIG. 11 is a circuit diagram illustrating a configuration of the multi-phase LLC resonant converter circuit of the conventional example.

FIG. 3 is a view illustrating a comparison between the effective value of the resonant current ir (ir1, ir2, ir3) flowing through any one of the resonant circuits 41, 42, 43 in the configuration (broken line) of the conventional example illustrated in FIG. 11 and the configuration (solid line) of the first embodiment illustrated in FIG. 1 when the value of the DC input voltage Vin is less than or equal to the rating (380 V) (set the inductance value to $L_n=L_r/3$). From FIG. 3, it can be seen that the increase in the effective value of the resonant current can be prevented in the first embodiment as compared with the conventional example.

In the single-phase operation mode, the control circuit 60 controls on and off of the first switch and the second switch of the series circuit of any one of the first, second, and third LLC resonant converters, and controls to turn off the first switch and the second switch of the other two LLC resonant converters. At this point, it is considered that the control circuit 60 controls on and off of the first switch Q11 and the second switch Q12 of the series circuit S1 of the first LLC resonant converter and controls to turn off the first switches Q21, Q31 and the second switches Q22, Q32 of the series circuits S2, S3 of the second and third LLC resonant converters in the single-phase operation mode.

The resonance frequency fa in the single-phase operation mode is expressed like Formula 2 as a resonance frequency by the resonant circuit 41, the resonant capacitors Cr2, Cr3, the divided resonant capacitors Cn2, Cn3, and the neutral line reactor Ln.

[Mathematical formula 2]

$$f_{r2} = \frac{1}{2\pi\sqrt{(L_r + L_n)\frac{3\alpha}{2\alpha+1}C_r}} \quad \text{(Formula 2)}$$

In the single-phase operation mode, the switching frequency f at which the switches Q11, Q12 of the first series circuit S1 are turned on and off may be set according to the resonance frequency $f_{r2}$ of Formula 2.

At this point, considering a condition ($f_{r2} \le f_{r1}$) that the resonance frequency does not increase when the three-phase operation mode is switched to the single-phase operation mode, Formula 3 is obtained from Formulas 1 and 2.

[Mathematical formula 3]

$$L_n \ge \frac{1-\alpha}{3\alpha}L_r \quad \text{(Formula 3)}$$

In particular, by setting the condition of formula 4 ($f_{r2}=f_{r1}$), the resonance frequency does not change during the switching between the three-phase operation mode and the single-phase operation mode, so that a transient characteristic during the switching can be improved.

[Mathematical formula 4]

$$L_n = \frac{1-\alpha}{3\alpha}L_r \quad \text{(Formula 4)}$$

When an inductance ratio between the neutral line reactor Ln and the resonant reactor Lr is $L_n/L_r=\lambda$, Formula 4 is expressed as Formula 5.

[Mathematical formula 5]

$$\frac{L_n}{L_r}=\lambda=\frac{1-\alpha}{3\alpha} \quad \text{(Formula 5)}$$

When Formula 5 is transformed into a form for the division ratio α, Formula 6 is obtained.

[Mathematical formula 6]

$$\alpha=\frac{1}{3\lambda+1} \quad \text{(Formula 6)}$$

By setting the inductance ratio $L_n/L_r=\lambda$ and the division ratio α of the neutral line reactor Ln and the resonant reactor Lr to the conditions in Formula 5 or Formula 6, the resonance frequency does not change during the switching between the three-phase operation mode and the single-phase operation mode ($f_{r2}=f_{r1}$).

Figure 4:
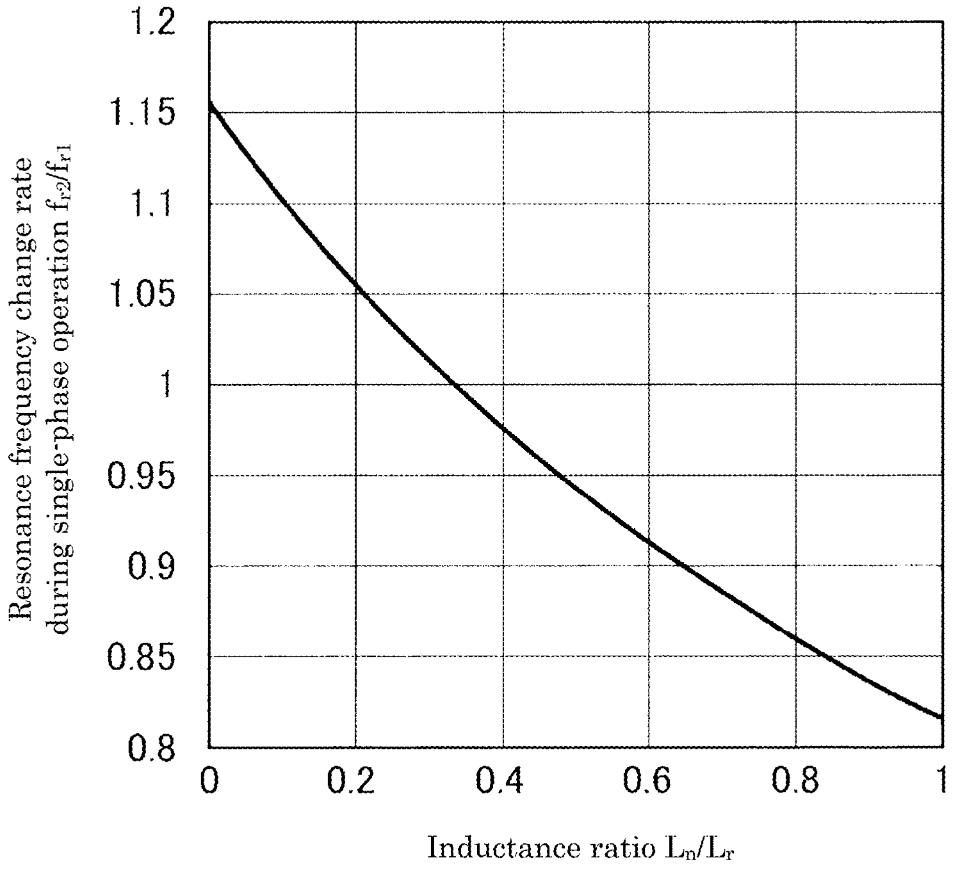
FIG. 4 is a view plotting a relationship between an inductance ratio $L_n/L_r$ and a resonance frequency change rate $f_{r2}/f_{r1}$ during a single-phase operation in a case where a division ratio $\alpha$ of capacitance=0.5.

FIG. 4 is a view illustrating the relationship between the inductance ratio $L_n/L_r$ of the neutral line reactor Ln and the resonant reactor Lr and a change rate $f_{r2}/f_{r1}$ of the resonance frequency when the three-phase operation mode is switched to the single-phase operation mode at α=0.5. As can be seen from FIG. 4, in the case of α=0.5, when $L_n/L_r=1/3$, the change rate of the resonance frequency $f_{r2}/f_{r1}=1$, namely, the resonance frequency does not change, and when $L_n/L_r>1/3$, $f_{r2}/f_{r1}<1$ is obtained, and the increase in the resonance frequency is prevented.

Figure 5:
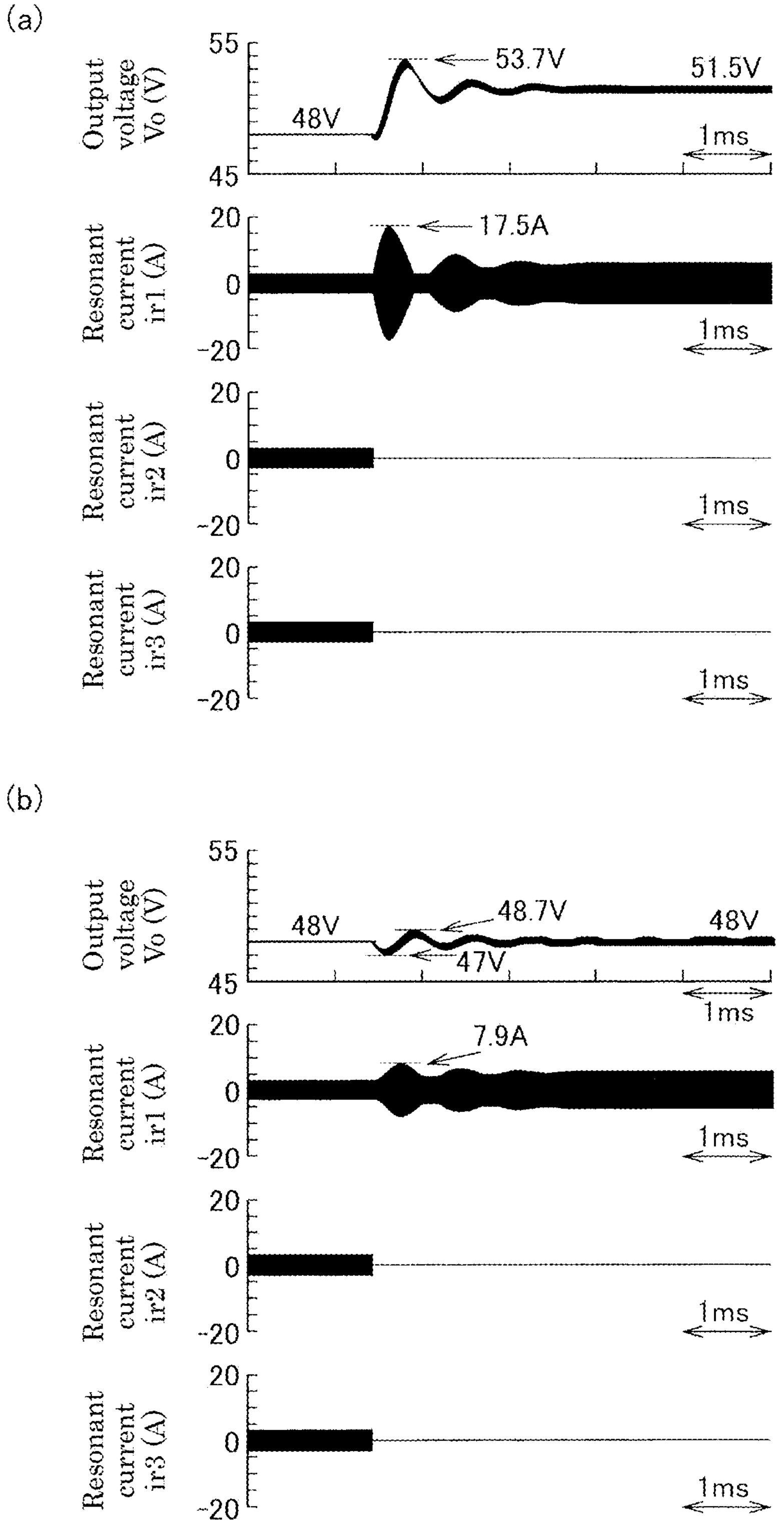
FIG. 5(*a*) illustrates transient waveforms of an output voltage and a resonant current of each phase when a three-phase operation is switched to the single-phase operation in the multi-phase LLC resonant converter circuit of the conventional example, and FIG. 5(*b*) illustrates transient waveforms of the output voltage and the resonant current of each phase when the three-phase operation is switched to the single-phase operation in the multi-phase LLC resonant converter according to the first embodiment.

FIG. 5(*a*) illustrates transient waveforms of the DC output voltage Vo and the resonant currents ir1, ir2, ir3 of the respective phases when the three-phase operation mode is switched to the single-phase operation mode at a fixed frequency in the multi-phase LLC resonant converter circuit 13 of the conventional example illustrated in FIG. 11. FIG. 5(*b*) illustrates transient waveforms of the DC output voltage Vo and the resonant currents ir1, ir2, ir3 of the respective phases when the three-phase operation mode is switched to the single-phase operation mode at a fixed frequency in the multi-phase LLC resonant converter circuit 10 (α=0.5, $L_n=L_r/3$) according to the first embodiment. An operation frequency f=69.4 kHz fixed, capacitance $C_o$ of the output capacitor Co=1000 μF, an equivalent series resistance=18 mΩ, and an output current Io=12.5 A (output power Po=600 W at an output voltage Vo=48.0 V) were used as conditions during the switching from the three-phase operation to the single-phase operation.

In the case of the conventional example illustrated in FIG. 5(*a*), immediately after the switching from the three phases to the single phase, a large overshoot is generated in both the output voltage Vo and the resonant current ir1, and the average value of the output voltage Vo after settling increases to 51.5 V. In the case of the first embodiment illustrated in FIG. 5(*b*), the overshoot of the output voltage Vo and the resonant current ir1 immediately after the switching from the three phases to the single phase is small, and the average value of the output voltage Vo after settling remains at 48.0 V.

Figure 6:
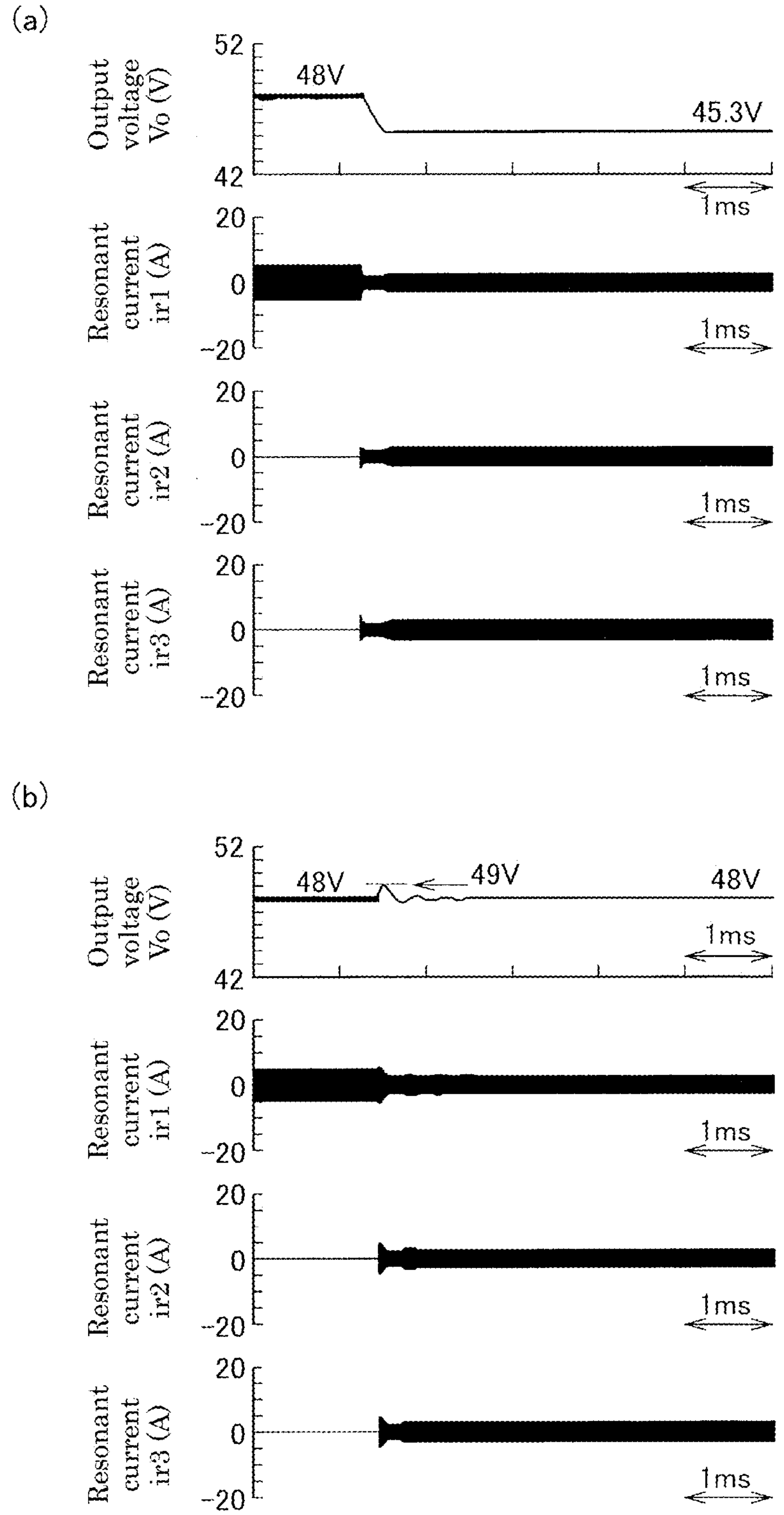
FIG. 6(*a*) illustrates transient waveforms of the output voltage and the resonant current of each phase when the single-phase operation is switched to the three-phase operation in the multi-phase LLC resonant converter circuit of the conventional example, and FIG. 6(*b*) illustrates transient waveform of the output voltage and the resonant current of each phase when the single-phase operation is switched to the three-phase operation in the multi-phase LLC resonant converter according to the first embodiment.

FIG. 6(*a*) illustrates transient waveforms of the DC output voltage Vo and the resonant currents ir1, ir2, ir3 of the respective phases when the single-phase operation mode is switched to the three-phase operation mode at a fixed frequency in the multi-phase LLC resonant converter circuit 13 of the conventional example illustrated in FIG. 11. FIG. 6(*b*) illustrates transient waveforms of the DC output voltage Vo and the resonant currents ir1, ir2, ir3 of the respective phases when the single-phase operation mode is switched to the three-phase operation mode at a fixed frequency in the multi-phase LLC resonant converter circuit 10 (α=0.5, $L_n=L_r/3$) according to the first embodiment. The operation frequency f of the conventional example is fixed at 79.8 kHz, the operation frequency f of the first embodiment is fixed at 69.4 kHz, the capacitance $C_o$ of the output capacitor Co is 1000 μF, the equivalent series resistance is 18 mΩ, and the output current Io=12.5 A (the output power Po=600 W at the output voltage Vo=48.0 V) were used as conditions during the switching from the single-phase operation to the three-phase operation.

In the case of the conventional example illustrated in FIG. 6(*a*), the output voltage average value after the settling falls to 45.3 V. In the case of the first embodiment illustrated in FIG. 6(*b*), the output voltage average value after the settling remains at 48.0 V.

For this reason, in the LLC resonant converter circuit 13 of the conventional example illustrated in FIG. 11, the operation of the operation frequency f by the feedback control is required when the number of phases is switched. However, in the LLC resonant converter circuit 10 according to the embodiment illustrated in FIG. 1, the operation of the operation frequency f by the feedback control can be made unnecessary when the number of phases is switched. For this reason, the LLC resonant converter circuit 10 according to the embodiment is suitable for application to, for example, a DC current transformer (DCX) expected to replace a commercial frequency transformer such as a pole-mounted transformer.

At this point, the case where the resonant reactors Lr1, Lr2, Lr3 and the neutral line reactor Ln are wound around a core of the same standard will be considered. When the number of turns of the resonant reactors Lr1, Lr2, Lr3 is $N_r$, the number of turns of the neutral line reactor Ln is $N_n$, and the turn ratio is $N_n/N_r=n$ ($=\sqrt{\lambda}$), Formula 2 can be rewritten as Formula 7.

[Mathematical formula 7]

$$f_{r2}=\frac{1}{2\pi\sqrt{(L_r+n^2L_r)\frac{3\alpha}{2\alpha+1}C_r}}=\frac{1}{2\pi\sqrt{\frac{3\alpha(1+n^2)}{2\alpha+1}L_rC_r}} \quad \text{(Formula 7)}$$

Accordingly, $f_{r2}=f_{r1}$ is obtained under the condition of Formula 8 as follows.

[Mathematical formula 8]

$$n=\sqrt{\frac{1-\alpha}{3\alpha}} \quad \text{(Formula 8)}$$

When Formula 8 is transformed into a formula related to the division ratio α, Formula 9 is obtained.

[Mathematical formula 9]

$$\alpha = \frac{1}{3n^2 + 1} \quad \text{(Formula 9)}$$

At this point, for example, in the case where α=0.5 is adopted, n=1/√3=0.577 may be satisfied.

For example, a three-leg core can be used as the core, and the reactors Lr1, Lr2, Lr3, and Ln may be wound around the middle leg of the three-leg core, but other forms may be used.

In the multi-phase LLC resonant converter circuit 10 according to the first embodiment, the first neutral line N1 is connected to the negative electrode (or the positive electrode) of the DC power supply 30 through the neutral line reactor Ln, so that the multi-phase LLC resonant converter circuit 10 can operate by switching between the multi-phase operation mode and the single-phase operation mode. Furthermore, because the neutral line reactor Ln exhibits a high impedance value with respect to the AC current of the high frequency component, during the boosting operation in the multi-phase operation mode, it is possible to suppress the harmonic component such as the third harmonic included in the resonant currents ir1, ir2, ir3 flowing through the resonant circuits 41,42, 43 can be reduced to prevent the increase in the effective value, and the harmonic component such as the third harmonic included in the neutral line current in flowing from the first neutral line N1 to the negative electrode (or the positive electrode) of the DC power supply 30 through the neutral line reactor Ln can be reduced.

In the first embodiment, the three-phase LLC resonant converter circuit with the number of phases N=3 has been described. However, a configuration like a multi-phase LLC resonant converter circuit including N LLC resonant converters with N=2 or N>3 may be used. In this case, in the multi-phase operation mode, the control circuit 60 may operate the LLC resonant converter such that the phase difference of the resonant current ir of each LLC resonant converter becomes 360°/N. The control circuit 60 can also operate that N1 (N1<N) of the N LLC resonant converters so as to stop the operation of the (N−N1) LLC resonant converters. As used herein, "control on and off of the first switch and the second switch of the first LLC resonant converter at the second frequency corresponding to the second resonance frequency by the resonant circuit and the neutral line reactor, and turn off the first switch and the second switch of second to the Nth LLC resonant converter" may be a plurality of LLC resonant converters as the "the first LLC resonant converter". For example, two switches of the four LLC resonant converters may be controlled at the second frequency and the remaining two switches may be turned off. Alternatively, two or three switches of the six LLC resonant converters may be controlled at the second frequency and the remaining four or three switches may be turned off.

In addition, in the single-phase operation mode, only one arbitrary LLC resonant converter among N LLC resonant converters of N=2 or N>3 may be operated. Even in this case, it is possible to operate similarly to the single-phase operation mode of the multi-phase LLC resonant converter circuit 10 according to the first embodiment.

Second Embodiment

Figure 7:
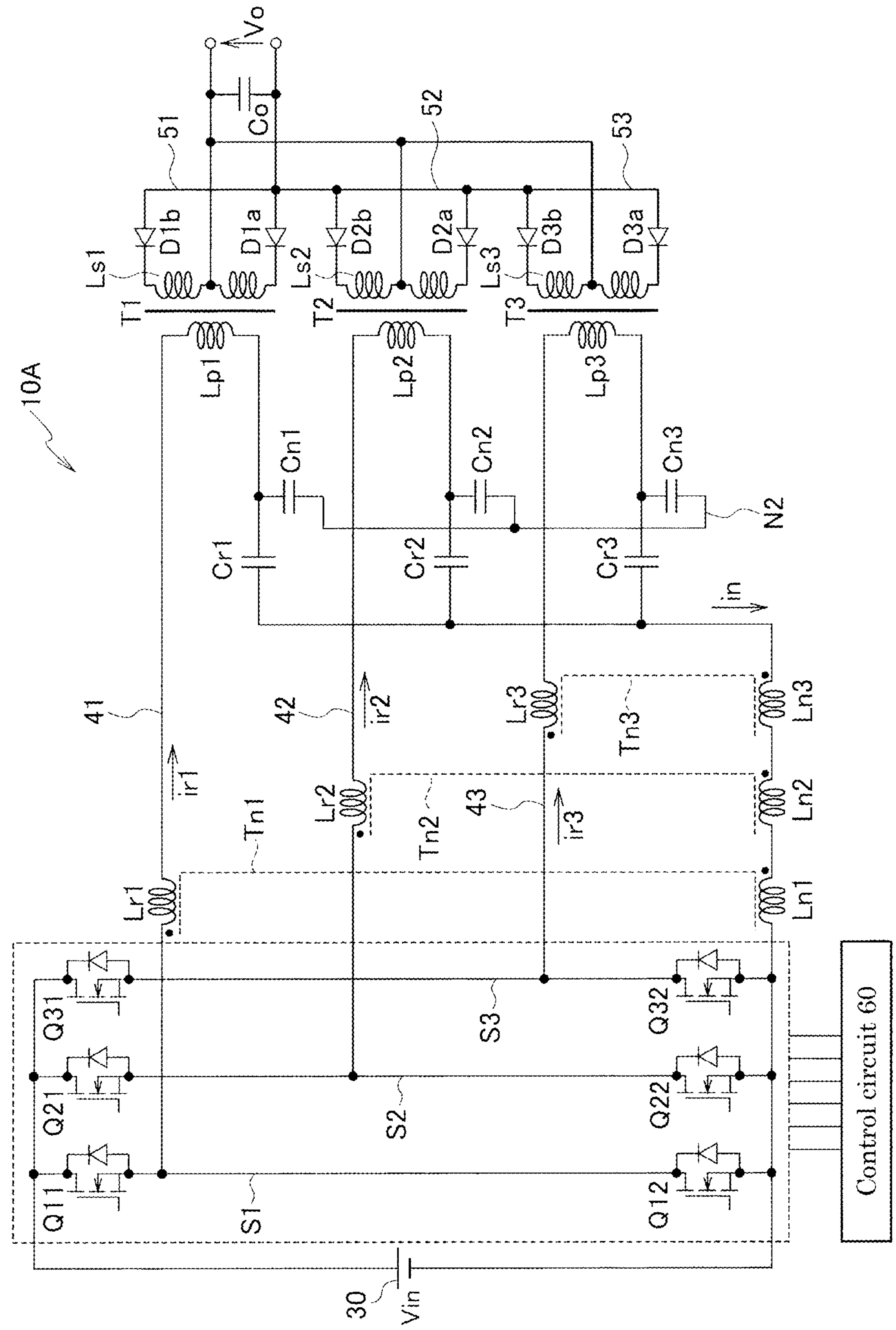
FIG. 7 is a circuit diagram illustrating a configuration of a multi-phase LLC resonant converter circuit according to a second embodiment.

FIG. 7 is a circuit diagram illustrating a configuration of a multi-phase LLC resonant converter circuit 10A according to a second embodiment.

The multi-phase LLC resonant converter circuit 10A is different from the first embodiment illustrated in FIG. 1 in that the multi-phase LLC resonant converter circuit 10A includes three neutral line reactors connected in series, namely, a first neutral line reactor Ln1, a second neutral line reactor Ln2, and a third neutral line reactor Ln3. In this case, only differences will be described, and description of common points will be omitted.

Figure 8:
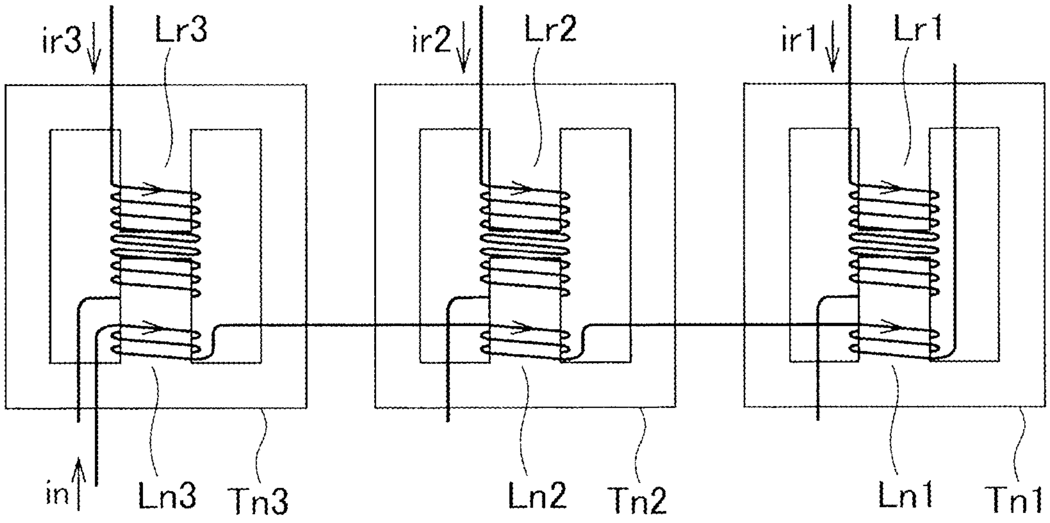
FIG. 8 is a view illustrating a configuration in which a resonant reactor and a neutral line reactor used in the multi-phase LLC resonant converter circuit according to the second embodiment are magnetically coupled by individual cores.

As illustrated in FIGS. 7 and 8, the first neutral line reactor Ln1 is magnetically coupled to the first resonant reactor Lr1 by a first core Tn1, the second neutral line reactor Ln2 is magnetically coupled to the second resonant reactor Lr2 by a second core Tn2, and the third neutral line reactor Ln3 is magnetically coupled to the third resonant reactor Lr3 by a third core Tn3.

In FIG. 8, a three-leg core is used as the core, and each reactor is wound around the middle leg of the three-leg cores Tn1, Tn2, Tn3. An air gap is provided in the vicinity of the center in the middle leg of the three-leg cores Tn1, Tn2, Tn3.

Figure 9:
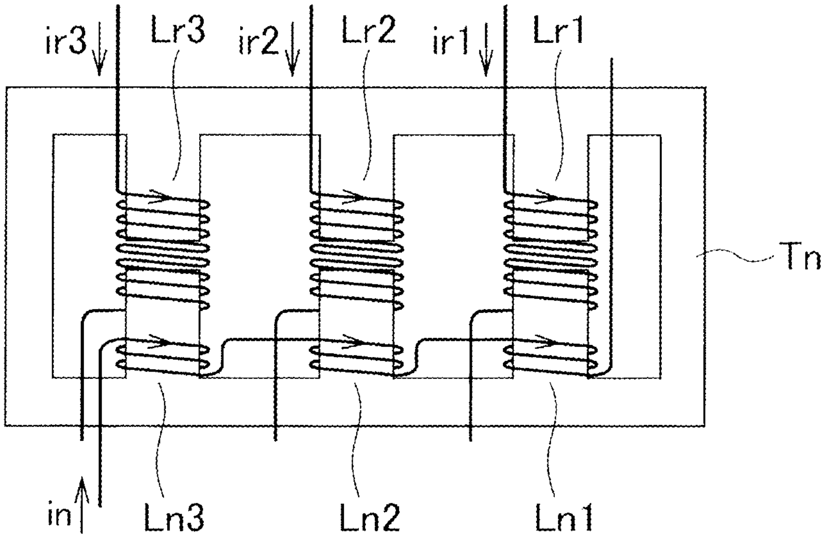
FIG. 9 is a view illustrating a configuration in which a resonant reactor and a neutral line reactor used in a multi-phase LLC resonant converter circuit according to a modification of the second embodiment are magnetically coupled by a five-leg core.

As a modification of FIG. 8, FIG. 9 illustrates the state in which a five-leg core Tn is used as the core and each reactor is wound around three legs on the center side. In three legs on the center side of the five-leg core Tn, the air gap is provided in the vicinity of the center of each leg. Even when the number of phases N is other than three, a similar configuration can be obtained using the core of the (N+2) leg. In addition, an arbitrary core other than those illustrated in FIGS. 8 and 9 can be adopted as the core depending on the intended use state.

In FIGS. 8 and 9, for convenience, the first neutral line reactor Ln1 and the first resonant reactor Lr1, the second neutral line reactor Ln2 and the second resonant reactor Lr2, and the third neutral line reactor Ln3 and the third resonant reactor Lr3 are separately illustrated. In practice, in order to increase a degree of mutual coupling, the first neutral line reactor Ln1 and the first resonant reactor Lr1, the second neutral line reactor Ln2 and the second resonant reactor Lr2, and the third neutral line reactor Ln3 and the third resonant reactor Lr3 are each in a tightly coupled state as a lap winding or a bifilar winding.

With the configuration as illustrated in FIGS. 8 and 9, the number of cores can be reduced as compared with the case where individual cores are used for the resonant reactors Lr1, Lr2, Lr3 and the neutral line reactor Ln like the first embodiment.

In the second embodiment, in a resonance frequency $f_{r3}$ of a three-phase operation mode, the fundamental wave of the resonant currents ir1, ir2, ir3 has a phase difference of 120°, and the fundamental wave component included in the current in flowing through the neutral line N1 is zero. The self-inductances of the neutral line reactors Ln1, Ln2, Ln3 and the mutual inductances between the resonant reactors Lr1, Lr2, Lr3 and the neutral line reactors Ln1, Ln2, Ln3 can be ignored, so that the resonance frequency fa is expressed as Formula 10 similarly to the first embodiment.

[Mathematical formula 10]

$$f_{r3} = \frac{1}{2\pi\sqrt{L_r C_r}} \quad \text{(Formula 10)}$$

On the other hand, third harmonic currents superimposed on the resonant currents ir1, ir2, ir3 have the same phase in each phase, and those in which the third harmonic currents of the respective phases are superimposed flow through the neutral line N1 and the neutral line reactors Ln1, Ln2, Ln3. For this reason, components of self-inductances of the neutral line reactors Ln1, Ln2, Ln3 and mutual inductances between the resonant reactors Lr1, Lr2, Lr3 and the neutral line reactors Ln1, Ln2, Ln3 are generated with respect to the third harmonic current.

At this point, the number of turns of the resonant reactors Lr1, Lr2, Lr3 is $N_r$, and for comparison with the first embodiment, the total number of turns of the neutral line reactors Ln1, Ln2, Ln3 is $N_n$, namely, the number of turns of each of the neutral line reactors Ln1, Ln2, Ln3 is $N_n/3$, the turn ratio between each of the resonant reactors Lr1, Lr2, Lr3 and each of the neutral line reactors Ln1, Ln2, Ln3 becomes $(N_n/3)/N_r=n/3$. Assuming that the self-inductance value of each of the neutral line reactors Ln1, Ln2, Ln3 is $l_n$, a resonant inductance value La of each of the resonant reactors with respect to the third harmonic current is expressed by Formula 11 by considering the self-inductance and the mutual inductance.

[Mathematical formula 11]

$$L_{rt}=L_r+3k\sqrt{L_r\cdot l_n}=L_r+3k\sqrt{L_r\cdot\left(\frac{n}{3}\right)^2L_r}=(1+kn)L_r \qquad \text{(Formula 11)}$$

At this point, k is a coupling coefficient between the resonant reactor winding and the neutral line reactor winding. As described above, the inductance value of the resonant reactor Lr can be increased with respect to the third harmonic current.

A total neutral line inductance value La of three series of the neutral line reactor for the third harmonic current in the three-phase operation mode is expressed by Formula 12.

[Mathematical formula 12]

$$L_{nt}=3\left(l_n+\frac{1}{3}k\sqrt{L_r\cdot l_n}\right)=3\left\{\left(\frac{n}{3}\right)^2+\frac{1}{3}k\frac{n}{3}\right\}L_r=\frac{1}{3}(n^2+kn)L_r \qquad \text{(Formula 12)}$$

A total inductance value L for the third harmonic current is expressed as Formula 13, noting that the resonant reactor is considered to be connected in parallel.

[Mathematical formula 13]

$$L_t=\frac{1}{3}L_{rt}+L_{nt}=\frac{1}{3}(1+2kn+n^2)L_r \qquad \text{(Formula 13)}$$

On the other hand, the total inductance value IA for the third harmonic current in the first embodiment is expressed by Formula 14.

[Mathematical formula 14]

$$L_t=\frac{1}{3}L_r+n^2L_r \qquad \text{(Formula 14)}$$

The condition that the total inductance value Lt of the second embodiment with respect to the third harmonic current is larger than that of the first embodiment is obtained like Formula 15 by comparing Formula 13 and Formula 14.

[Mathematical formula 15]

$$n<k \qquad \text{(Formula 15)}$$

That is, when the coupling coefficient is k to 1 in the tight coupling and the turn ratio n<1 (n/3<1/3=0.333), the total inductance value of the second embodiment is larger than the total inductance value of the first embodiment with respect to the third harmonic current. In other words, in the case of the turn ratio n<1 (n/3<1/3=0.333), the total inductance value of the second embodiment can be set to a value substantially equal to the total inductance value of the first embodiment even when the total number of turns of the neutral line reactors Ln1, Ln2, Ln3 of the second embodiment is made smaller than the number of turns $N_n$ of the neutral line reactor Ln of the first embodiment with respect to the third harmonic current.

Subsequently, a total resonant inductance value $L_{rt1}$ in the single-phase operation mode will be considered. The total resonant inductance value $L_{rt1}$ during the single-phase operation is expressed by Formula 16 by considering the self-inductance and the mutual inductance of Lr1.

[Mathematical formula 16]

$$L_{rt1}=L_r+k\sqrt{L_r\cdot l_n}=\left(1+k\frac{n}{3}\right)L_r \qquad \text{(Formula 16)}$$

Similarly, the total neutral line inductance value $L_{nt1}$ in the single-phase operation mode is considered. The total neutral line inductance value $L_{nt1}$ during the single-phase operation is expressed by Formula 17 because it is sufficient to consider the self-inductance and the mutual inductance for Ln1 and consider only the self-inductance for Ln2, Ln3.

[Mathematical formula 17]

$$L_{nt1}=\left(l_n+k\sqrt{L_r\cdot l_n}\right)+2l_n=\left\{3\left(\frac{n}{3}\right)^2+k\frac{n}{3}\right\}L_r \qquad \text{(Formula 17)}$$

Accordingly, a resonance frequency $f_{r4}$ in the single phase operation mode is expressed as Formula 18 by using the total inductance value $L_{rt1}$ including the mutual inductance for the resonant reactor Lr.

[Mathematical formula 18]

$$f_{r4}=\frac{1}{2\pi\sqrt{(L_{rt1}+L_{nt1})\frac{3\alpha}{2\alpha+1}C_r}}=\frac{1}{2\pi\sqrt{\left\{1+2k\frac{n}{3}+3\left(\frac{n}{3}\right)^2\right\}\frac{3\alpha}{2\alpha+1}L_rC_r}} \qquad \text{(Formula 18)}$$

In the single-phase operation mode, the switching frequency f at which the switches Q11, Q12 of the first series circuit S1 is turned on and off may be set according to the resonance frequency $f_{r4}$ of Formula 18.

From Formula 15, Formula 19 is obtained as a condition ($f_{r4}=f_{r3}$) that the resonance frequency does not change when the three-phase operation mode is switched to the single-phase operation mode.

[Mathematical formula 19]

$$\left\{1+2k\frac{n}{3}+3\left(\frac{n}{3}\right)^2\right\}\frac{3\alpha}{2\alpha+1}=1 \quad \text{(Formula 19)}$$

Formula 20 is obtained by solving Formula 19 for n/3. However, the coupling coefficient was set to k=1 (tight coupling).

[Mathematical formula 20]

$$\frac{n}{3}=\frac{1-\sqrt{\alpha}}{3\sqrt{\alpha}} \quad \text{(Formula 20)}$$

Accordingly, the resonance frequency $f_{r3}$ in the three-phase operation mode is equal to the resonance frequency $f_{r4}$ in the single-phase operation mode ($f_{r4}=f_{r3}$) by setting the turn ratio to a value n/3 obtained from Formula 20 using the adopted division ratio α. For example, when the division ratio α=0.5 is adopted, the resonance frequency does not change during the switching between the three-phase operation mode and the single-phase operation mode ($f_{r4}=f_{r3}$) by setting the turn ratio n/3=0.138.

Formula 21 is obtained when Formula 20 is transformed into a formula related to the division ratio α.

[Mathematical formula 21]

$$\alpha=\frac{1}{\left\{3\left(\frac{n}{3}\right)+1\right\}^2}=\frac{1}{(n+1)^2} \quad \text{(Formula 21)}$$

The resonance frequency $f_{r3}$ in the three-phase operation mode becomes equal to the resonance frequency $f_{r4}$ in the single-phase operation mode ($f_{r4}=f_{r3}$) by setting the division ratio α to a value obtained from Formula 21 using the adopted turn ratio n/3 or n.

At this point, when the ratio between the total number of turns $N_n$ of the neutral line reactors Ln1, Ln2, Ln3 and the total number of turns $3N_r$ of the resonant reactors Lr1, Lr2, Lr3 in the second embodiment is defined as a winding increase rate ρ, the winding increase rate ρ is expressed by Formula 22 from Formula 20.

[Mathematical formula 22]

$$\rho=\frac{N_n}{3N_r}=\frac{n}{3}=\frac{1-\sqrt{\alpha}}{3\sqrt{\alpha}} \quad \text{(Formula 22)}$$

On the other hand, when the ratio between the number of turns $N_n$ of the neutral line reactor Ln and the total number of turns $3N_r$ of the resonant reactors Lr1, Lr2, Lr3 in the case of not using the magnetic coupling like the first embodiment is defined as a winding increase rate $\rho_0$, the winding increase rate $\rho_0$ is expressed by Formula 23 from Formula 8.

[Mathematical formula 23]

$$\rho_0=\frac{N_n}{3N_r}=\frac{n}{3}=\frac{1}{3}\sqrt{\frac{1-\alpha}{3\alpha}} \quad \text{(Formula 23)}$$

Figure 10:
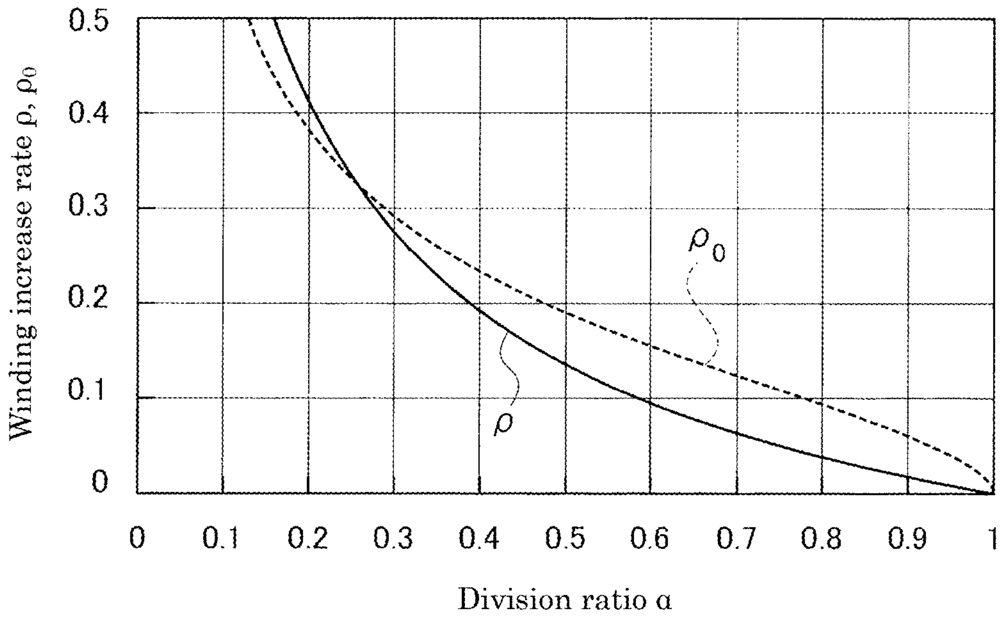
FIG. 10 is a view in which a winding increase rate ρo of the first embodiment and a winding increase rate ρ of the second embodiment are plotted with respect to the division ratio $\alpha$ of the capacitance.

FIG. 10 is a plot of the winding increase rate ρ in the second embodiment of Formula 22 and the winding increase rate $\rho_0$ in the first embodiment of Formula 23 with respect to the division ratio α. Accordingly, in the range of the division ratio α>0.25, the winding increase rate ρ in the second embodiment is smaller than the winding increase rate $\rho_0$ in the first embodiment ($\rho<\rho_0$), namely, the number of turns of the neutral line reactor is smaller when the magnetic coupling is used like the second embodiment than when the magnetic coupling is not used like the first embodiment.

Also in the multi-phase LLC resonant converter circuit 10A according to the second embodiment, similarly to the first embodiment, the neutral line N1 is connected to the power supply line on the negative electrode side (or the positive electrode side) of the DC power supply 30 through the neutral line reactors Ln1, Ln2, Ln3, the multi-phase LLC resonant converter circuit 10A can switch between the multi-phase operation mode and the single-phase operation mode. Because the neutral line reactors Ln1, Ln2, Ln3 exhibit high impedance values with respect to the AC current of the harmonic component, during the boosting operation in the multi-phase operation mode, the harmonic components such as the third harmonic included in the resonant currents ir1, ir2, ir3 flowing through the resonant circuits 41, 42, 43 are reduced to prevent the increase in the effective value. Furthermore, the harmonic components such as the third harmonic current included in the neutral line current in flowing from the neutral line N1 to the power supply line on the negative electrode side (or the positive electrode side) of the DC power supply 30 through the neutral line reactors Ln1, Ln2, Ln3 can be reduced.

The invention claimed is:

1. A multi-phase LLC resonant converter circuit that converts a first DC voltage of a DC power supply into a second DC voltage to output the second DC voltage, the multi-phase LLC resonant converter circuit comprising:

first to Nth (N is an integer greater than or equal to 2) LLC resonant converters each including a series circuit in which a first switch and a second switch are connected in series, the series circuit being connected in parallel to the DC power supply, a high-frequency transformer including a primary-side winding and a secondary-side winding, a resonant circuit including a resonant reactor connected between a connection point between the first switch and the second switch and one end of the primary-side winding, a resonant capacitor in which one end is connected to another end of the primary-side winding, and a divided resonant capacitor in which one end is connected to a connection point between the primary-side winding and the resonant capacitor, and a rectifier circuit that rectifies output of the secondary-side winding;

a first neutral line that connects other ends of the resonant capacitors of the first to Nth LLC resonant converters to each other;

a neutral line reactor connected between the first neutral line and a power supply line of one of a positive electrode and a negative electrode of the DC power supply;

a second neutral line that connects other ends of the divided resonant capacitors of the first to Nth LLC resonant converters to each other; and an output capacitor connected in parallel to an output side of the rectifier circuit of the first to Nth LLC resonant converters to output a second DC voltage to both ends.

2. The multi-phase LLC resonant converter circuit according to claim 1, further comprising a control circuit that controls on and off of the first switch and the second switch of the first to Nth LLC resonant converters, wherein the control circuit includes:

a multi-phase operation mode that controls on and off of each of the first switch and the second switch of the first to Nth LLC resonant converters at a first frequency corresponding to a first resonance frequency by the resonant circuit such that a resonant current of the first frequency flowing through the series resonant circuit of the first to Nth LLC resonant converters has a phase difference of 360°/N; and a single-phase operation mode that controls on and off of the first switch and the second switch of the first LLC resonant converter at a second frequency corresponding to a second resonance frequency by the resonant circuit and the neutral line reactor, and turns off the first switch and the second switch of the second to Nth LLC resonant converters.

3. The multi-phase LLC resonant converter circuit according to claim 2, wherein a division ratio of capacitances of the resonant capacitor and the divided resonant capacitor and an inductance ratio of a resonant reactor and the neutral line reactor are set such that the first resonance frequency and the second resonance frequency are equal to each other.

4. The multi-phase LLC resonant converter circuit according to claim 1, wherein the resonant reactor is leakage inductance of the high-frequency transformer.

5. The multi-phase LLC resonant converter circuit according to claim 1, wherein the neutral line reactor includes first to Nth neutral line reactors that are N reactors that are connected in series and have an equal inductance value, and N pairs of the resonant reactors of the first to Nth LLC resonant converters and the first to Nth neutral line reactors are magnetically coupled by first to Nth cores, respectively.

6. The multi-phase LLC resonant converter circuit according to claim 5, wherein the resonant reactors of the first to Nth LLC resonant converters and the first to Nth neutral line reactors are wound as a lap winding.

7. The multi-phase LLC resonant converter circuit according to claim 5, wherein the resonant reactors of the first to Nth LLC resonant converters and the first to Nth neutral line reactors are wound as a bifilar winding.

8. The multi-phase LLC resonant converter circuit according to claim 1, wherein the neutral line reactor includes first to Nth neutral line reactors that are N reactors that are connected in series and have an equal inductance value, and the resonant reactors of the first to Nth LLC resonant converters and the first to Nth neutral line reactors are magnetically coupled by second to (N+1) middle legs of (N+2) leg cores, respectively.

9. The multi-phase LLC resonant converter circuit according to claim 8, wherein the resonant reactors of the first to Nth LLC resonant converters and the first to Nth neutral line reactors are wound as a lap winding.

10. The multi-phase LLC resonant converter circuit according to claim 8, wherein the resonant reactors of the first to Nth LLC resonant converters and the first to Nth neutral line reactors are wound as a bifilar winding.

* * * * *